United States Patent [19]
Byrd

[11] Patent Number: 6,091,173
[45] Date of Patent: *Jul. 18, 2000

[54] ELECTROMECHANICAL MACHINE HAVING SHIELD ARRANGEMENT FOR SHAFT CURRENT REDUCTION

[75] Inventor: David M. Byrd, Athens, Ga.

[73] Assignee: Reliance Electric Industrial Company, Milwaukee, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/891,022

[22] Filed: Jul. 10, 1997

[51] Int. Cl.$^7$ .............................. H02K 17/30; H02K 5/15
[52] U.S. Cl. ................... 310/85; 310/86; 310/89; 310/90; 310/211; 310/256
[58] Field of Search .................. 310/85, 86, 261, 310/256, 90, 89, 196, 211

[56] References Cited

U.S. PATENT DOCUMENTS

| | | | |
|---|---|---|---|
| 3,335,308 | 8/1967 | Robinson | 310/211 |
| 4,488,077 | 12/1984 | Kovacs | 310/212 |
| 5,097,163 | 3/1992 | Shah et al. | 310/51 |
| 5,325,005 | 6/1994 | Denk | 310/68 B |

FOREIGN PATENT DOCUMENTS 56-133958  10/1981  Japan ................. 310/256

*Primary Examiner*—Nestor Ramirez
*Assistant Examiner*—Burton Mullins
*Attorney, Agent, or Firm*—Craig N. Killen; John J. Horn; Alex M. Gerasimow

[57] ABSTRACT

An electromechanical machine includes a stator fixed with respect to a housing structure and a rotor fixed with respect to a shaft. The shaft is rotatably supported by a pair of bearing assemblies maintained in the housing structure. A pair of coilheads extend from respective sides of the stator core axially external of the rotor. Shaft shields, preferably configured as tubular members, radially interpose the shaft and the respective coilhead. The shaft shields may be constructed of a magnetically permeable material to divert flux that would otherwise cut through the shaft. As a result, errant currents that could be induced in the shaft by such flux are desirably reduced.

4 Claims, 4 Drawing Sheets

6,091,173

ELECTROMECHANICAL MACHINE HAVING SHIELD ARRANGEMENT FOR SHAFT CURRENT REDUCTION

BACKGROUND OF THE INVENTION

The present invention relates generally to the art of electromechanical machines having a rotating shaft, such as generators and electric motors. More particularly, the invention relates to an arrangement for shielding the shaft of an electromechanical machine to lessen the generation of errant shaft currents.

The shaft of an electromechanical machine is often supported by bearing assemblies maintained in position by the machine housing. In one known construction, each bearing assembly is supported by a portion of the housing known as the "end bell." As its name implies, the end bell is located at one axial end of the housing, and defines a hole through which the rotatable shaft freely extends. The machine may be constructed to either allow or prevent slight axial movement of the bearing assembly, depending upon the exigencies of a particular application.

Operation of the machine will often cause various currents to be produced in the rotating shaft. Seeking ground, the currents may flow through the bearing assembly into the machine's housing. Flow of current through the bearing assembly in this manner may give rise to more frequent maintenance requirements or other problems in the operation of the machine. For example, the currents can arc to the bearing elements, causing "pits" or other undesirable effects.

SUMMARY OF THE INVENTION

The present invention recognizes and addresses the foregoing disadvantages, and others, of prior art constructions and methods. Accordingly, it is an object of the present invention to provide improved electromechanical machines.

It is a further object of the present invention to provide electromechanical machines in which errant shaft currents are reduced.

It is a particular object of the present invention to provide an electromechanical machine in which errant shaft currents are reduced via diversion of stray flux that would otherwise cut through the shaft.

It is a particular object of the present invention to provide an electromechanical machine including an easily realized shaft shield.

It is a further object of the present invention to provide an improved arrangement including a magnetically permeable shaft shield.

Some of these objects are achieved by an electromechanical machine comprising a housing structure rotatably supporting a shaft along a predetermined central axis. The machine includes a stator fixed with respect to the housing structure and having a plurality of conductive windings radially spaced about the central axis. A rotor, fixed with respect to the shaft, is located radially inward of the stator. The rotor has a plurality of current paths radially spaced about the central axis. At least one shaft shield is supported by the housing structure and extends about the shaft at a location axially external of the rotor.

In exemplary embodiments, the housing structure maintains at least one bearing assembly to rotatably support the shaft. Preferably, the shaft shield axially extends from a location adjacent the rotor to a location adjacent the bearing assembly. For example, the housing structure may maintain first and second bearing assemblies, each having a respective first and second shaft shield associated therewith.

The housing structure itself may comprise a cylindrical portion having first and second end bells connected at respective opposite ends thereof. In this case, each of the end bells will preferably maintain a respective bearing assembly. First and second cap elements may be connected to the respective end bells on axially internal sides of the bearing assemblies. Each such cap element preferably maintains an associated shaft shield in position about the shaft.

In some exemplary embodiments, the shaft shield is constructed as a unitary member. In such constructions, the unitary member may be configured having a substantially tubular configuration. The shaft shield may also be constructed of a magnetically permeable material to substantially divert magnetic flux that would otherwise cut through the shaft.

Other objects of the invention are achieved by an electromechanical machine comprising a housing structure including a cylindrical portion having first and second end bells connected at respective opposite ends thereof. First and second bearing assemblies are respectively maintained by the end bells to rotatably support a shaft.

The electromechanical machine further includes a rotor fixed with respect to the shaft to be rotatable therewith. A stator is fixed with respect to the housing structure and located radially external of the rotor. The stator has first and second coilheads extending beyond the rotor on both axial ends thereof. First and second shaft shields are radially interposed between respective coilheads and the shaft. The shaft shields are configured to reduce electrical currents produced in the shaft during operation of the electromechanical machine.

In exemplary constructions, the shaft shields axially extend from a location adjacent the rotor to a location adjacent an associated bearing assembly. Some such embodiments include first and second cap elements respectively connected to the first and second end bells axially internal of the associated bearing assembly. Each such cap element may maintain an associated shaft shield in position about the shaft.

In some exemplary embodiments, the first and second shaft shields are configured as respective integral extensions of the associated cap element. The shaft shields may each be configured as a separate tubular element connected to the respective cap element. The separate tubular element may be connected to the cap element, for example, by threading, press fitting, welding or adhesive.

Other objects of the invention are achieved by an arrangement comprising a housing portion defining a configured receptacle. A bearing assembly, including opposed ring members having a plurality of bearing elements located therebetween, is located in the configured receptacle. A shaft is rotatably supported by the bearing assembly.

The arrangement also includes a source of magnetic flux spaced apart from the shaft. In addition, a shaft shield, constructed of a magnetically permeable material, is interposed between the source of magnetic flux and the shaft. The shaft shield functions to divert flux that would otherwise cut through the shaft.

In exemplary embodiments, the source of magnetic flux has an annular configuration extending about the shaft. The shaft shield may comprise a tubular element connected to the housing structure to interpose the source of magnetic flux and the shaft. Such a tubular element may extend from a cap element attached to the housing structure at a location axially adjacent the bearing assembly.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
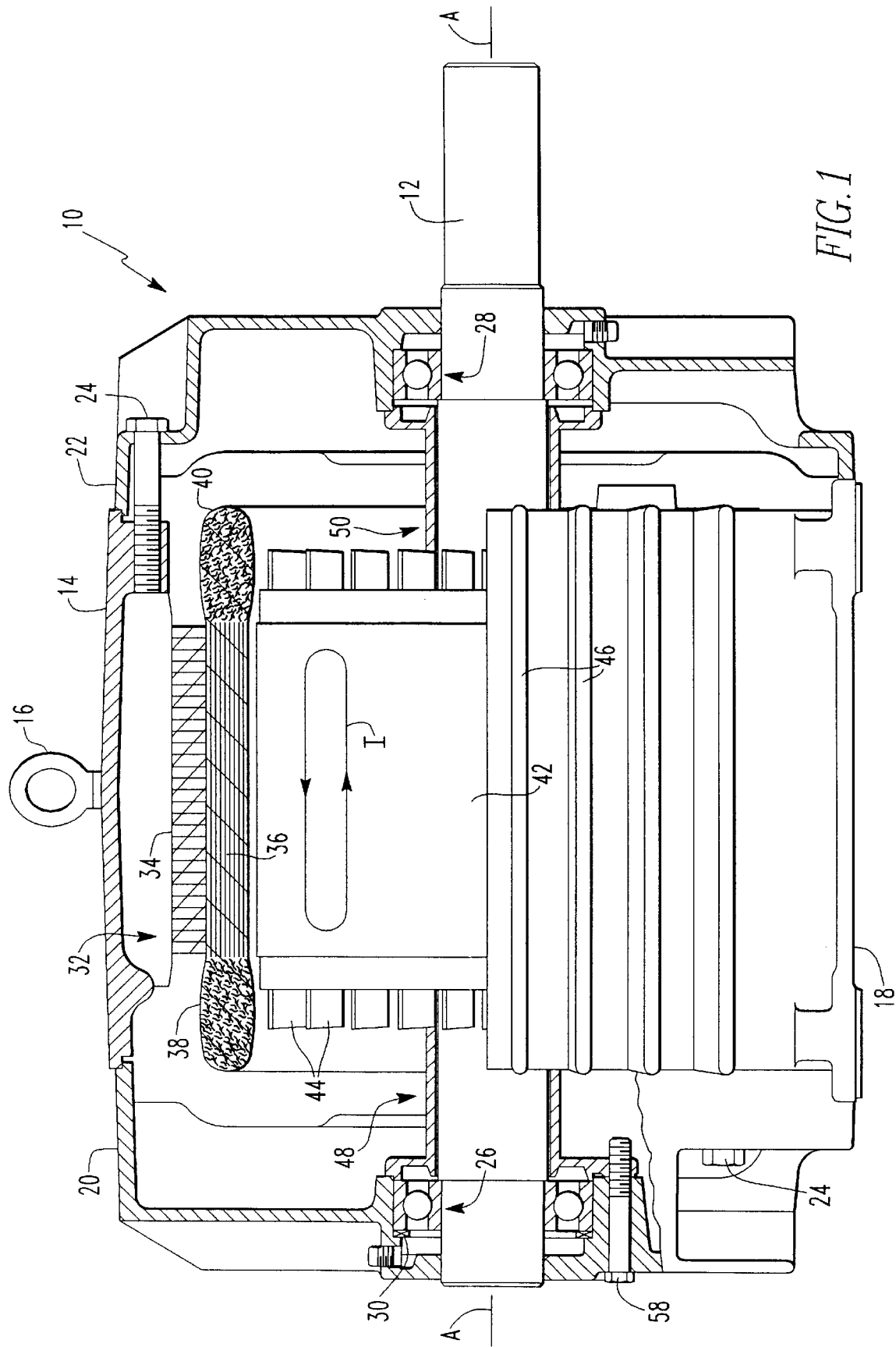
FIG. 1 is an elevational view of an electric motor showing the motor housing partially cut away to reveal various internal components therein.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 illustrates an electromechanical machine constructed according to the present invention. In particular, FIG. 1 illustrates an electric motor 10 having a rotatable shaft 12 extending along a central axis A. The internal components of motor 10 are enclosed by a housing including a main housing portion 14. One or more eyebolts 16 may be provided to facilitate lifting of motor 10. Main housing portion 14 defines an appropriate base 18 on which motor 10 may rest during use.

The housing of motor 10 further includes a pair of "end bells" 20 and 22 located at respective axial ends of main housing portion 14. End bells 20 and 22 may be attached to main housing portion 14 by any appropriate means, such as by bolts 24. As shown, end bells 20 and 22 maintain respective bearing assemblies 26 and 28 for facilitating rotation of shaft 12.

Shaft 12 continues through bearing assembly 28 and beyond end bell 22 for connection to other equipment. In this case, bearing assembly 26 is located near a terminal end of shaft 12. A thrust washer 30 is located adjacent bearing assembly 26 to urge it in the direction of bearing assembly 28, while allowing for slight axial movement of shaft 12.

Inside of its housing, motor 10 includes a stator 32 that remains fixed during operation. Stator 32 includes a slotted core 34 preferably comprising a plurality of relatively thin laminations arranged in a stack. As indicated at 36, longitudinal windings are located in the respective slots to provide a flow path for flux-generating current. The windings turn at respective coilheads 38 and 40 to return along a parallel slot.

A rotor 42, secured to shaft 12, desirably rotates based on the electromagnetic interaction between it and stator 32. Toward this end, rotor 42 is constructed to define a plurality of parallel current paths, such as the current path indicated at I. In the illustrated embodiment, motor 10 is an induction motor, wherein rotor 42 is constructed as a "squirrel cage" in a known manner. A plurality of radial vanes, such as vanes 44, may be provided at the periphery of the rotor side walls to circulate cooling air inside the motor housing. Fins 46 may be provided on the motor housing to further facilitate dissipation of heat.

During operation, errant currents may be induced in shaft 12 by stray flux present inside the motor housing. In particular, stray flux, such as flux emanating from coilheads 38 and 40, may cut through shaft 12 to induce these undesirable currents. Such currents will flow to the motor housing (i.e., ground) if direct electrical connection from shaft 12 is permitted.

A particular problem results when current from shaft 12 flows to end bells 20 and 22 through respective bearing assemblies 26 and 28. As described above, arcing in the bearing assembly can pit the rolling bearing elements. This may increase maintenance requirements or cause other problems in the operation of motor 10. To reduce undesirable shaft currents, the present invention utilizes shaft shields 48 and 50.

Figure 2:
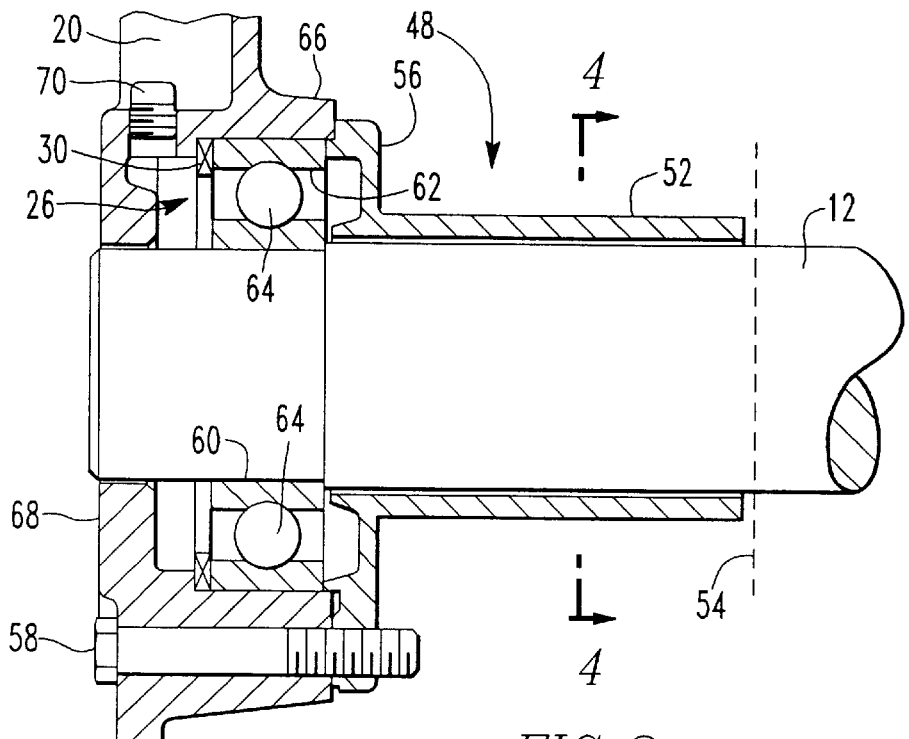
FIG. 2 is a partial cross-sectional view showing an arrangement of the present invention for shielding the rotatable shaft.

The construction of shaft shield 48 is shown in greater detail in FIG. 2, although it will be understood that shaft shield 50 is similarly constructed. As illustrated, shaft shield 48 includes an elongated tubular portion 52 encircling shaft 12. Tubular portion 52 preferably extends from a location adjacent an axially internal side of bearing assembly 26 to a location adjacent an axial side wall (denoted here by the broken line 54) of rotor 42.

In this embodiment, tubular portion 52 is defined as an integral extension of an annular cap element 56. Cap element 56 may be connected to end bell 20 utilizing a plurality of threaded members, such as bolt 58, angularly spaced apart from one another. Often, three such bolts spaced apart by approximately 120 degrees may be utilized for this purpose.

FIG. 2 also shows greater detail regarding bearing assembly 26 and the manner in which it is maintained in end bell 20. In this case, bearing assembly 26 includes an inner ring member 60 in contact with shaft 12 for rotation therewith. Inner ring member 60 defines a raceway on its outer circumferential surface. An outer ring member 62 defines an outer raceway on its inner circumferential surface. The respective raceways of inner ring member 60 and outer ring member 62 are radially opposed to define a space in which a plurality of bearing elements are received. In this case, the bearing elements are constructed as ball bearings 64, although tapered roller bearings or other bearing elements may be used in appropriate situations.

As can be seen, bearing assembly 26 is positioned in a generally annular structure 66 integrally extending from the wall of end bell 20 in an inward axial direction. In particular, structure 66 defines an annular receptacle into which bearing assembly 26 is received. This receptacle is bounded by cap element 56 on one axial side and by a closing flange 68 on the other. Grease or a similar lubricating compound can be inserted into this region through a grease drain, which is normally closed during operation by a threaded plug 70.

Figure 3:
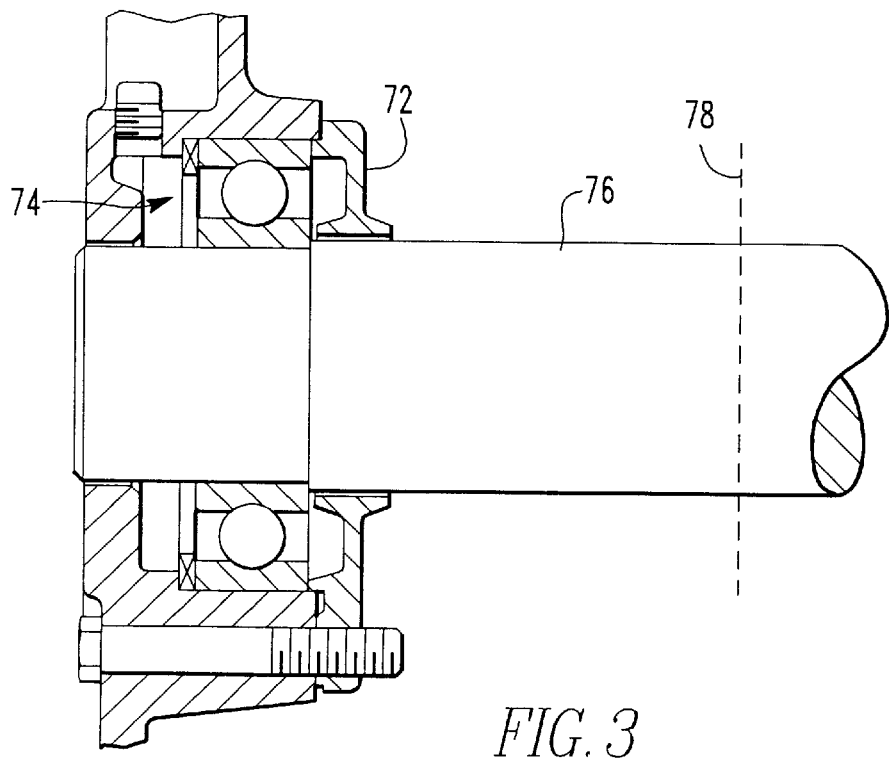
FIG. 3 is a view similar to FIG. 2 illustrating a prior art end cap arrangement.

FIG. 3 illustrates a typical arrangement of the prior art. It can be seen that portions of the prior art construction are similar to conventional aspects of the embodiment illustrated in FIG. 2. In the prior art arrangement, however, cap element 72 serves primarily to abut bearing assembly 74 and to enclose the region in which it is maintained so that lubricant will not freely escape. As such, the portion of shaft 76 between the side wall of the rotor (indicated at 78) and cap element 72 will not be covered. Because cap element 72 does not encircle an appreciable axial portion of shaft 76, it will not serve as an effective shield for diversion of stray flux in the manner of the present invention.

The manner which shaft shields 48 and 50 function in some exemplary embodiments to divert stray flux from cutting through shaft 12 will now be explained in greater detail. In the absence of a magnetically permeable material, magnetic flux will be distributed in the region between magnetic poles of opposite polarity. A magnetically permeable material may be placed in the region, however, to form a magnetic circuit in which substantially all of the magnetic flux is concentrated. Shaft shields 48 and 50, when made of a ferrous or other magnetically permeable material, complete a magnetic circuit that diverts substantial stray flux from cutting through shaft 12.

Figure 4:
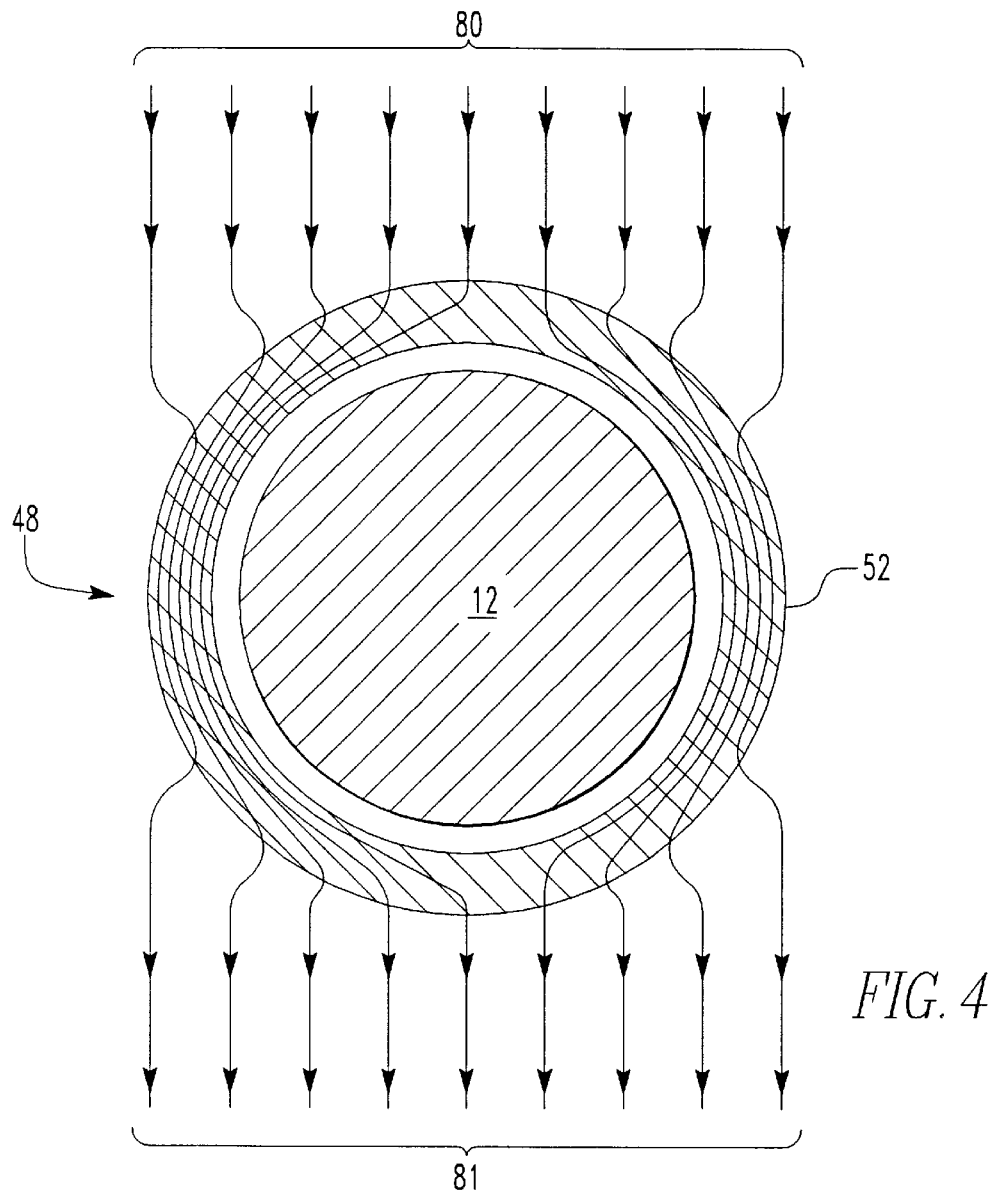
FIG. 4 is an enlarged cross-sectional view as taken along line 4—4 of FIG. 2 diagrammatically illustrating diversion of magnetic flux that would otherwise cut through the shaft.
Figure 5:
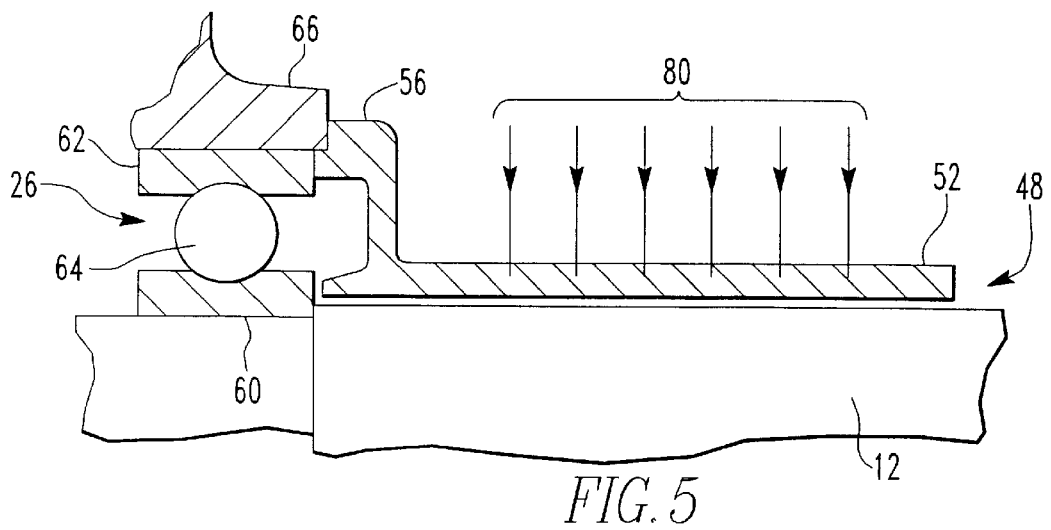
FIG. 5 is a partial cross-sectional view enlarged from FIG. 2 diagrammatically illustrating diversion of magnetic flux that would otherwise cut through the shaft.

This is illustrated in FIGS. 4 and 5, where stray magnetic flux that may emanate for example from one pole 80 of coilhead 38. Instead of cutting through shaft 12, the flux is concentrated in tubular member 52 of shaft shield 48. The flux travels around tubular member 52 until proceeding to the opposite pole 81. In this example, poles 80 and 81 are separated by 180 degrees, although in many embodiments other angular separations can be expected. Because very little flux will remain to cut through shaft 12, undesirable currents that would otherwise be induced therein are substantially reduced.

Figure 6A:
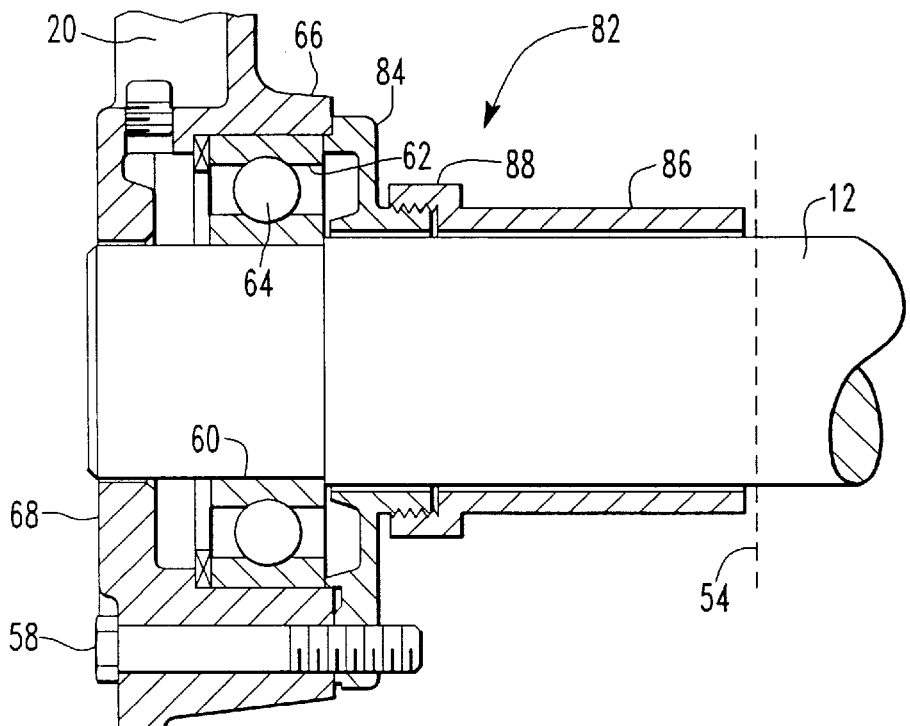
FIGS. 6A and 6B are partial cross sectional views illustrating respective alternative constructions of the shaft shield arrangement.
Figure 6B:
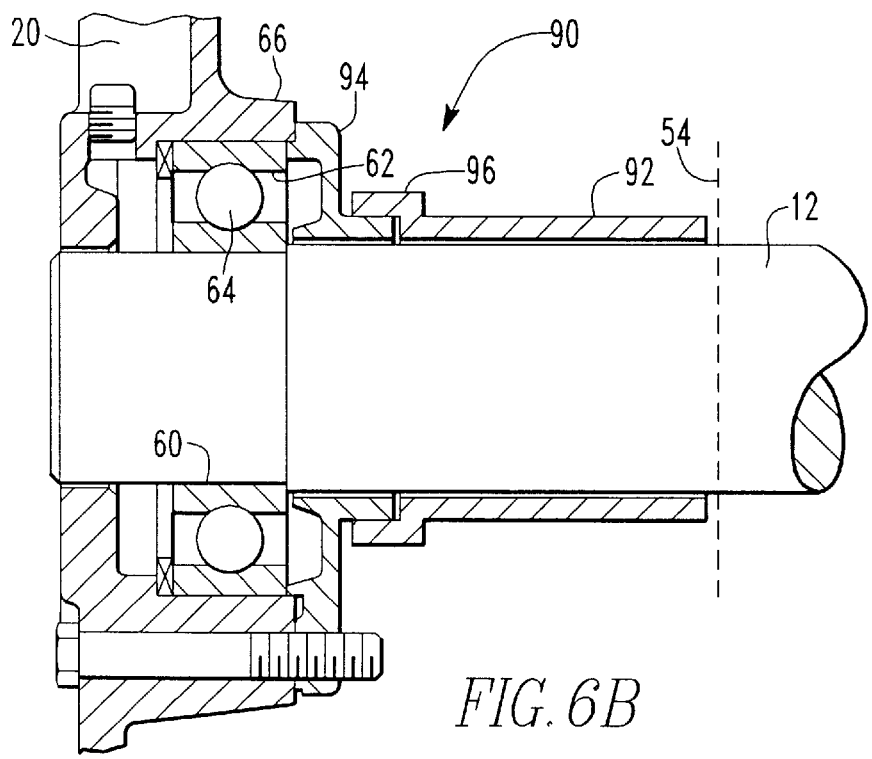

FIGS. 6A and 6B illustrate alternative arrangements for constructing shaft shields in accordance with the present invention. In particular, FIG. 6A illustrates a shaft shield 82 comprising an annular cap element 84 to which a separable tubular element 86 is attached. As shown, tubular element 86 includes a greater diameter portion 88 defining interior threads. These interior threads engage exterior threads defined about cap element 84, as shown.

FIG. 6B illustrates a shaft shield 90 having a separable tubular element 92 attached to an annular cap element 94. Tubular element 92 includes a greater diameter portion 96 extending over cap element 94. In some cases, it may be desirable to maintain greater diameter portion 96 in position on cap element 94 by press fitting. In other cases, greater diameter portion 96 may be somewhat looser, but maintained in position by welding or adhesive.

It can thus be seen that the present invention provides improved arrangements for reducing errant currents that may be produced in a rotating shaft during operation of an electromechanical machine. While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. An electric motor of the AC type, said electric motor comprising:

a housing structure including a cylindrical portion having first and second end bells connected at respective opposite ends thereof;

a shaft rotatably supported by said housing structure along a predetermined central axis:

first and second bearing assemblies maintained by respective end bells of said housing structure to rotatably support said shaft;

a stator fixed with respect to said housing structure, said stator having a plurality of conductive windings radially spaced about said central axis;

a rotor located radially inward of said stator and fixed with respect to said shaft, said rotor having a plurality of current paths radially spaced about said central axis;

first and second shaft shields supported by said housing structure and being associated with a respective one of said first and second bearing assemblies, said shaft shields extending about said shaft from a location axially external to said rotor but adjacent thereto to a location adjacent a respective of said bearing assemblies;

said shaft shields being constructed of a magnetically permeable material to substantially divert magnetic flux that would otherwise cut through said shaft; and first and second cap elements connected to a respective of said first and second end bells adjacent axially internal sides of said first and second bearing assemblies, each said cap element maintaining an associated one of said first and second shaft shields in position about said shaft.

2. An electric motor as set forth in claim 1, wherein said at least one shaft shield is constructed as a unitary member.

3. An electric motor as set forth in claim 2, wherein said unitary member has a substantially tubular configuration.

4. An electric motor as set forth in claim 1, wherein said electric motor is an AC induction motor.

\* \* \* \* \*